United States Patent [19]

Coutts et al.

[11] Patent Number: 5,048,915
[45] Date of Patent: Sep. 17, 1991

[54] OPTIC CABLE TERMINATION

[76] Inventors: Bruce Coutts, P.O. Box 2162, Costa Mesa, Calif. 92628; Kathleen M. Kruse, 6544 Archer, Riverside, Calif. 98509

[21] Appl. No.: 451,068

[22] Filed: Dec. 15, 1989

[51] Int. Cl.⁵ ............................................. G02B 6/36
[52] U.S. Cl. .................................................... 385/86
[58] Field of Search ............... 350/96.20, 96.21, 96.22, 350/96.23

[56] References Cited

U.S. PATENT DOCUMENTS

| | | | |
|---|---|---|---|
| 4,787,699 | 11/1988 | Mouline | 350/96.21 |
| 4,787,701 | 11/1988 | Stenges et al. | 350/96.20 |
| 4,790,622 | 12/1988 | Levinson et al. | 350/96.20 |
| 4,812,008 | 3/1989 | Tokumaru et al. | 350/96.20 X |

*Primary Examiner*—William L. Sikes
*Assistant Examiner*—Phan T. Heartney

[57] ABSTRACT

A relatively simple method is provided for terminating an optic cable to a terminus body, so the optical fiber, buffer, and outer jacket of the cable are all held securely to a terminus body with the end of the optical fiber closely held in position. The method includes forming the terminus body (14, FIG. 2) with a bore extending through its length, the bore including a front bore portion (30) that closely receives the optical fiber, a second bore portion (40) that closely surrounds the buffer, and a third bore portion (42) that closely surrounds a front outer jacket region (18). Adhesive (34) is placed in the second bore portion to fill most of it. The optic cable is positioned with the optical fiber (22) extending through the front bore portion and with the buffer (20) lying against the rear of the quantity of adhesive. With the adhesive in a flowable state, the optic cable is pressed forward (F) while the terminus body is held against movement, so the buffer presses like a piston into the second bore portion to force adhesive through the front bore portion around the fiber, and also to displace adhesive so it flows rearwardly around the buffer and around the front jacket region, to thereby allow a single quantity of adhesive to hold all three parts of the optic cable in place.

12 Claims, 3 Drawing Sheets

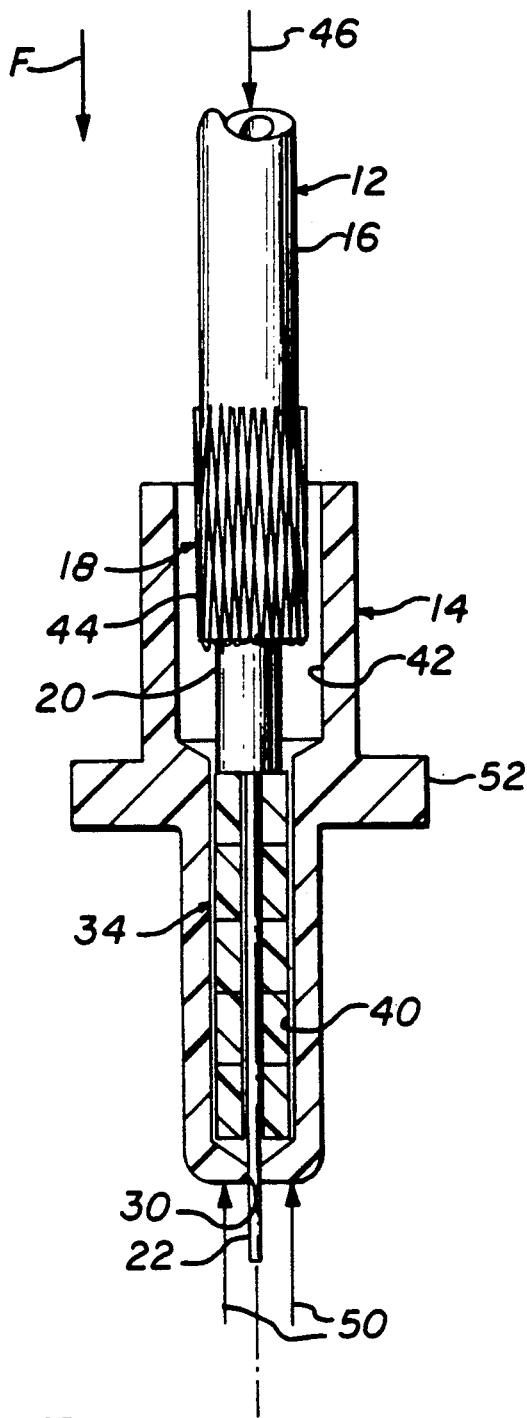
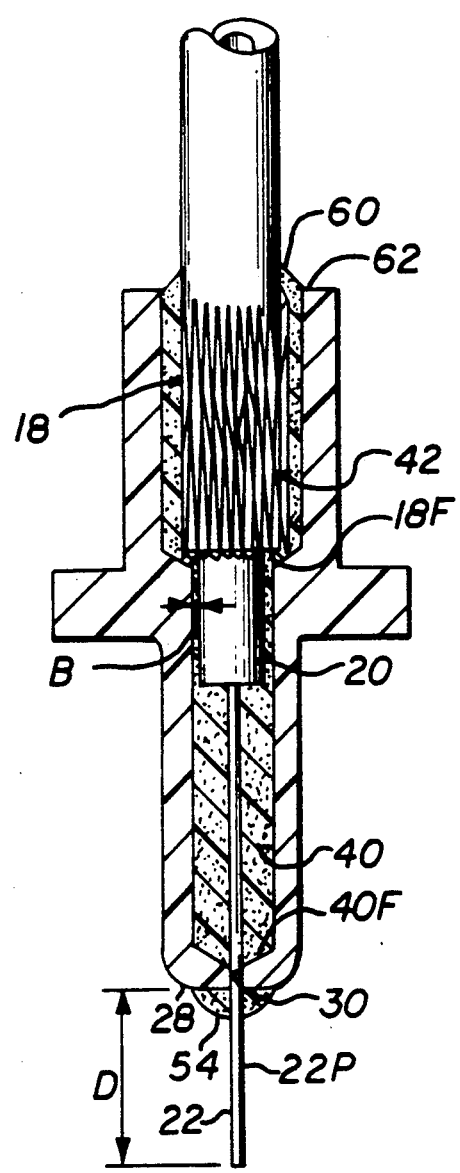
FIG. 2
FIG. 3

OPTIC CABLE TERMINATION

BACKGROUND OF THE INVENTION

The optical fiber of an optic cable is often coupled to another optic device by stripping away the outer jacket and buffer surrounding the optical fiber and holding the front end of the optical fiber in a terminus body that can be mounted with high precision. It is sometimes necessary to hold the front of the jacket to the terminus body so no part of the cable moves axially with the respect to the other parts. "User friendly" methods have been developed to facilitate rapid termination of an optic cable, but such methods have generally required complex and expensive terminus bodies, have not held the buffer and/or cable jacket securely enough, and/or involved steps that make the termination method complicated. A method and apparatus for terminating an optic cable to a terminus body, which used simple parts, provided secure holding of the buffer and/or cable jacket as well as the optic fiber, and was simple and of low cost, would be of considerable value.

SUMMARY OF THE INVENTION

In accordance with one embodiment of the present invention, a method and apparatus are provided which enable the termination of an optic cable to a terminus body, which provides for secure holding of the cable parts in a relatively simple manner and by the use of simple and low cost apparatus. A termination method includes forming the terminus body to include a bore extending through its length, with a front bore portion that closely receives the optical fiber and a larger second bore portion that receives the buffer of the optic cable. The second bore portion is largely filled with adhesive. The optic cable is positioned with its optical fiber extending through the second and front bore portions with the buffer lying against the quantity of adhesive, and possibly with a front jacket region (which includes the jacket and/or a strengthening member thereabout) lying in the rear of the bore. With the adhesive in a highly viscous but flowable state, the optic cable is pushed forwardly relative to the terminus body. The buffer acts like a piston that presses into the second bore portion to displace adhesive therein, so a small portion of the adhesive flows forwardly into the front bore portion around the fiber. Also, considerable adhesive may flow rearwardly around the buffer and possibly around a front jacket region in the bore as the front jacket region moves more deeply into the rear portion of the bore. When the adhesive hardens, the single quantity of adhesive bonds the optical fiber and buffer, and possibly also the front jacket region to the terminus body. The jacket itself can be used as a piston to force viscous fluid forward through the front bore portion, and rearwardly around the front jacket region.

The novel features of the invention are set forth with particularity in the appended claims. The invention will be best understood from the following description when read in conjunction with the accompanying drawings.

BRIEF DESCRIPTION OF THE DRAWINGS

FIG. 2 is a sectional side view of the termination of FIG. 1, shown during a step in the termination method.

FIG. 3 is a view similar to that of FIG. 2, but shown at a later stage in the termination method.

FIG. 5 is a view taken on the line 5—5 of FIG. 4.

DESCRIPTION OF THE PREFERRED EMBODIMENT

Figure 1:
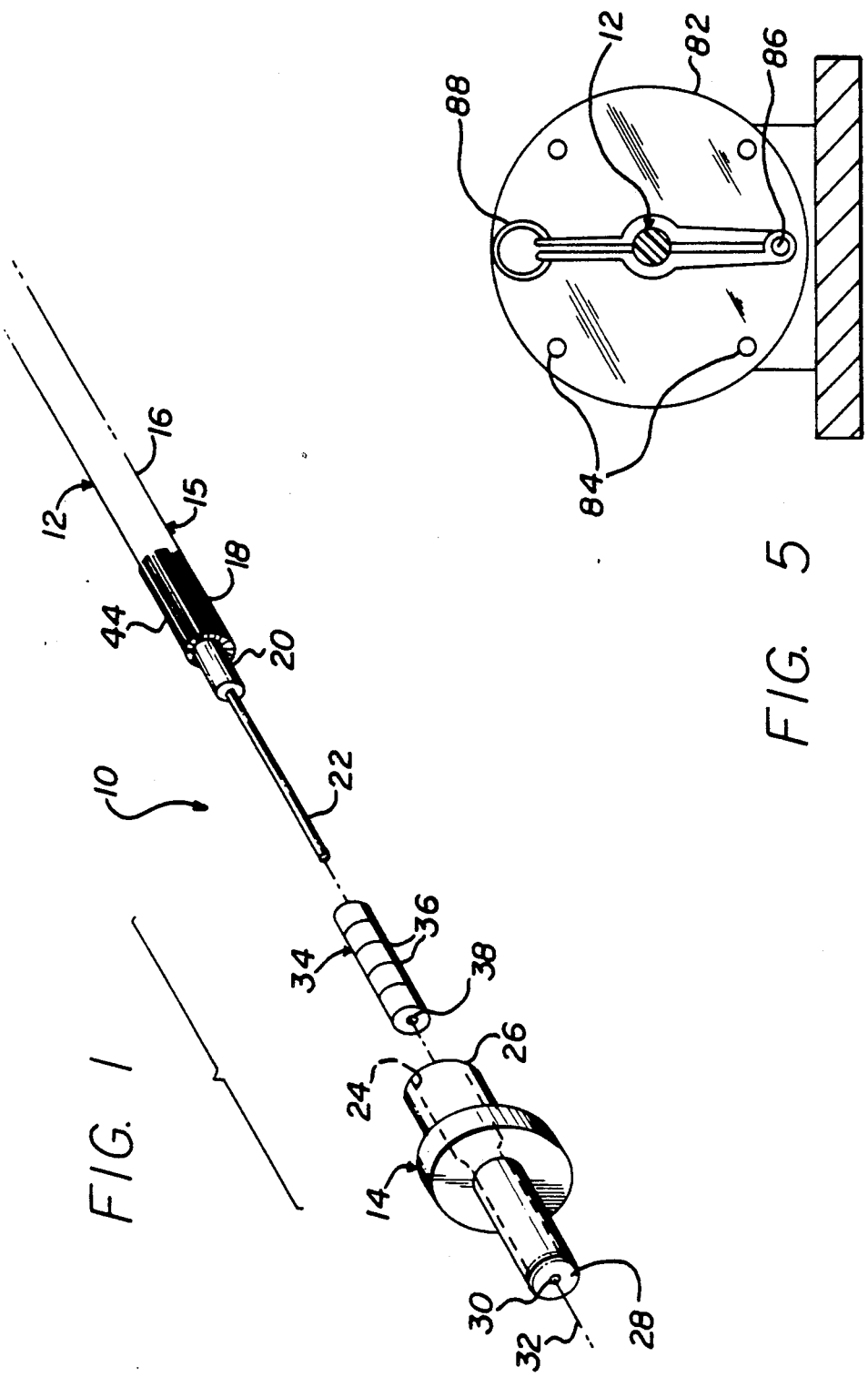
FIG. 1 an exploded isometric view of an optic cable termination constructed in accordance with the present invention.

FIG. 1 illustrates a termination 10 which includes an optic cable 12 and a terminus body 14. The optic cable includes an optical fiber 22 and a cable protective portion 15 that surrounds the fiber and that includes an outer jacket 16 with a front outer jacket region 18, and a buffer 20 within the outer jacket. The jacket 16 and buffer 20 form parts of the cable protective portion 15. It should be noted that some cables do not include a jacket around the buffer. A strength member 44 comprising multiple threads (e.g., of Kevlar) may lie in the outer jacket (e.g., of Teflon), and the strength member is folded back around the front of the jacket to form the front jacket region 18. The terminus body 14 has a bore 24 extending through its entire length, between the rear 26 of the body and the front 28 thereof. The bore includes a front bore end or end portion 30 which is of a size to closely receive the optical fiber 22, to closely locate the optical fiber so the axis of the tip of the optical fiber lies closely concentric with the axis 32 of the terminus body. A quantity of adhesive 34 is used to bond different portions of the optic cable to the terminus body bore. The adhesive 34, such as a B stage epoxy, is initially in the form of a plurality of pellets 36 of substantially solid adhesive which is activated by heat, so the adhesive becomes flowable, though viscous. The pellets 36 are ring shaped, with holes 38 through which the optical fiber 22 can pass.

FIG. 2 shows an early step in the method by which the optic cable 12 is terminated to the terminus body 14. The terminus body is constructed with a second bore portion 40 lying directly behind the front bore portion 30. The second bore portion 40 is formed to closely surround a portion of the cable that surrounds the optical fiber, such cable portion being the buffer 20 of the optic cable in this embodiment of the invention. The body is also formed with a third bore portion 42 of a size to closely surround the front jacket region 18. As mentioned above, the outer jacket 16 of the cable is often constructed of a material such as Teflon which has a very low surface energy so it may be difficult to bond to. The strength member 44 in the form of Kevlar fibers is easier to bond to.

The cable 12 is installed with the adhesive 34 filling most of the second bore portion 40, with the front end of the buffer 20 against the adhesive 34, and with the front jacket region 18 lying at least partially within the third bore portion 42. The adhesive 34 is then changed to a flowable state, as by heating it. With the adhesive in a flowable state, a forward force indicated by arrow 46 is applied to the optic cable, by applying force to the outer jacket 16 in a forward direction indicated by arrow F. At the same time, a rearward force indicated by arrow 50 is applied to the terminus body 14 (actually to a flange 52 thereof) to resist forward movement of the body. As a result, the cable 12 is moved forwardly within the body to the position shown in FIG. 3.

As the cable moves forwardly deeper into the terminus body, the buffer 20 of the cable acts like a piston that compresses the flowable adhesive 34 within the second bore portion. If there is appreciable clearance between the fiber and front bore portion 30, then some of the flowable adhesive moves forwardly to completely fill the front end 40f of the second bore portion and to then flow around that portion of the optical fiber 22 lying within the front bore portion 30, to thereby bond the optical fiber directly to the walls of the front bore portion 30. Some additional adhesive may flow forwardly through the front bore portion to form a projecting adhesive portion 54 lying forward of the front end 28 of the terminus body. The projecting adhesive portion 54 is useful to stabilize the front end of the optical fiber as it is cut and then ground to lie substantially flush with the front end 28 of the terminus body, which is a usual last step in the termination process.

If there is a substantial clearance B between the buffer 20 and second bore portion 40, then as the optic cable 12 is pushed forwardly and the buffer 20 presses forwardly into the mass of adhesive, most of the displaced adhesive moves rearwardly along the outside of the buffer 20. In most cases, the clearance B between the buffer and a second bore portion is much greater than between the optical fiber and front bore portion, so there is only small resistance to rearward movement of adhesive around the buffer. The adhesive flows into the third bore portion 42 to fill the front end of the third bore portion. As the optic cable continues to be pressed forwardly, the front end 18f of the front jacketed region 18 presses against the quantity of adhesive lying at the front of the third bore portion. The front jacket region 18 acts like a piston to displace the adhesive lying in the front of the third bore portion, which results in the adhesive flowing rearwardly around the front jacket region 18. The amount of adhesive used is preferably sufficient so that it fills most of the space between the front jacket region 18 lying within the third bore portion 42 and the walls of third bore portion. Generally, a small amount of adhesive 60 flows to the rear end 62 of the terminus body. Thus, forward movement of the cable into the bore, with portions of the cable surrounding the optical fiber acting to displace adhesive so it flows rearwardly around portions of the cable, results in the same quantity of adhesive flowing throughout most of the bore length, to bond not only the optical fiber but also the front jacket region to the terminus body. The adhesive (after hardening) around the buffer is useful to prevent sideward buffer movement relative to the optical fiber to avoid breaking the fiber, even if the adhesive does not bond to the buffer.

After the cable has been installed as shown in FIG. 3, the adhesive is allowed to harden. Then the projecting portion 22p of the optical fiber that projects forward of the projecting adhesive portion 54 is cut, and the optical fiber is generally ground so its tip lies even with the front end 28 of the terminus body. The termination can then be coupled to another optical device such as another similarly terminated optical cable, by placing the front of the two terminations in a tube that holds them concentric, to hold the optic fibers in alignment, with their ground and polished tips abutting one another. It should be noted that there are other ways of coupling an optic fiber to another device, such as by rounding the end of the optical fiber tip, although grinding and polishing the optical fiber end flat is the most common way.

Figure 4:
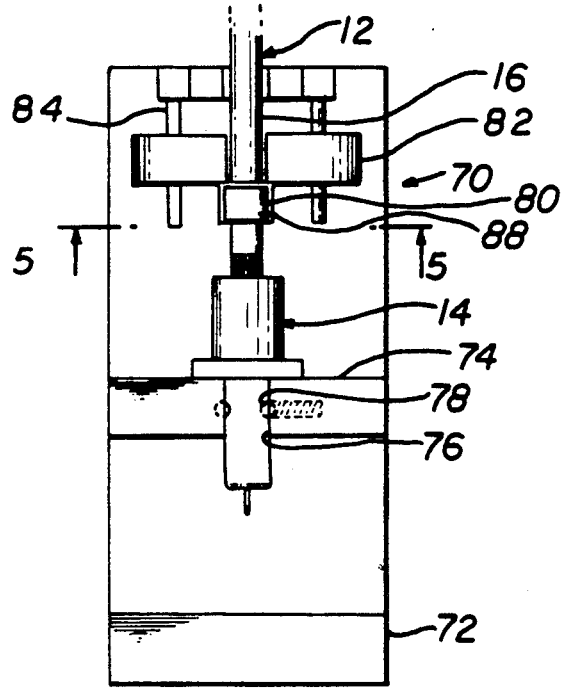
FIG. 4 is a front elevation view of the termination a of FIG. 3, and also showing equipment that can be used to perform the termination method.

A wide variety of devices can be used to force the optic cable forwardly into the terminus body, including devices that hold the optic cable steady while moving the terminus body rearwardly. FIGS. 4 and 5 illustrate one type of device 70. The device includes a stand with a bottom 72 that can rest on a table top, and a terminus body holder 74 with a slot 76 into which the body can be inserted, with spring-biased detents 78 for holding the body in its inserted position. A clamp 80 clamps to the outer jacket 16 of an optic cable 12. A weight 82 coupled to the clamp 80 urges the optic fiber 12 downwardly into the terminus body 14. The weight is guided in its vertical movement by guide shafts 84. The clamp 80 includes a pair of pivotal arms pivoted at 86 on the weight, and a spring 88 that clamps the arms together that clamp the optic cable 12 in place.

The clearance B (FIG. 3) between the buffer and the walls of the second bore portion 40 is usually less than the diameter or radius of the buffer 20 so the buffer is "closely" received. The smaller the clearance, the more pressure is applied forcing the adhesive forwardly through the front bore portion 30. The amount of pressure required depends on the viscosity of the flowable adhesive. For the purpose of filling at least part of the third bore portion 42 with adhesive to hold the front jacket region 18, it is desirable to provide moderately small clearances around the buffer and front jacket region. Such moderately small clearances allow filling the third bore portion with adhesive around the jacket region, with only moderate axial piston-like movement of the cable into the terminus body.

Figure 6:
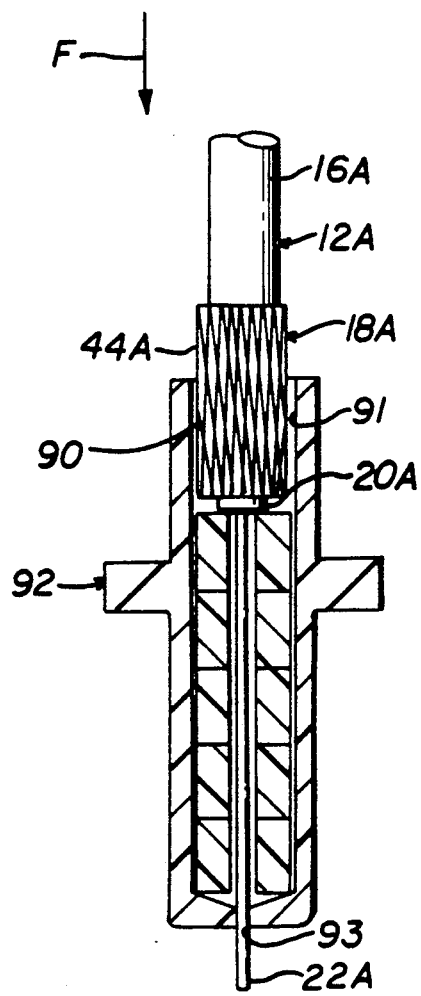
FIG. 6 is a sectional side view of a termination of another embodiment of the invention, at a stage in the termination method.

As shown in FIG. 6, it is possible to trim the buffer 20A of an optic cable 12A to be largely even with the front of the jacket 16A, and to use all of the cable except the frber as a piston. The portion 90 of the cable that surrounds the fiber (including the front jacket region 18A and buffer 20A) is here used as the piston. The front jacket region 18A lies fairly closely surrounded in a second or rear bore portion 91 of terminus body 92 and the optical fiber 22A extends through a front bore portion 93 that very closely surrounds it. When the surrounding portion 90 of the cable is moved forward along direction F relative to the terminus body, the portion 90 acts as a piston to push adhesive forward and backward. However, a larger clearance is generally required around the front jacket region with its strength member 44A, so it is generally not as efficient a piston in pushing adhesive through the front bore portion and preventing voids as is a buffer.

Figure 7:
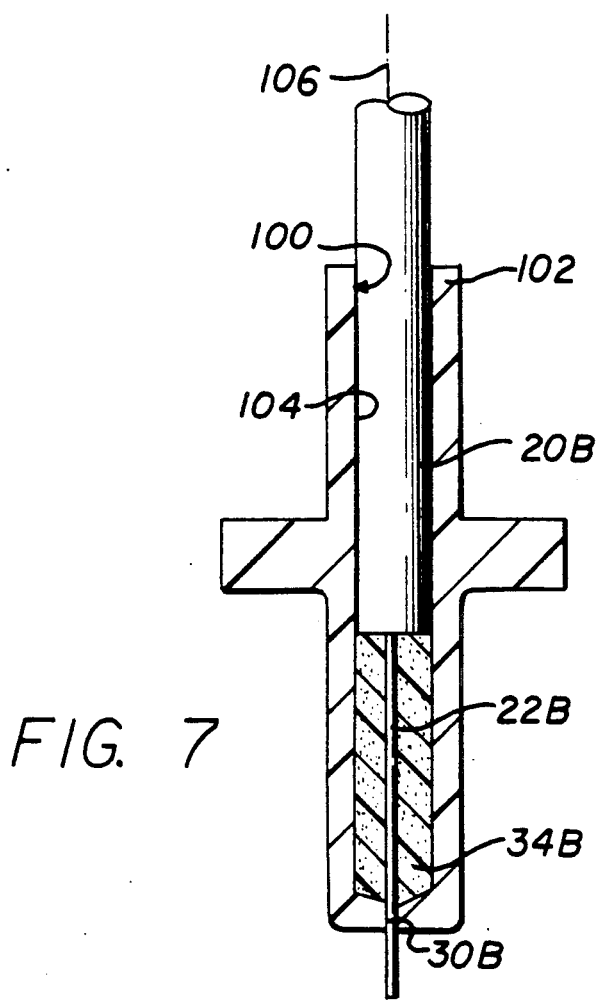
FIG. 7 is a sectional side view of a termination of another embodiment of the invention.

FIG. 7 illustrates another arrangement, where only the buffer 20B and optical fiber 22B lie in a bore 100 of a terminus body 102. Either there is no jacket around the buffer or it has been trimmed back and is not bonded to the terminus body. If there were sufficient clearance between the buffer and bore 100, then substantial adhesive pumped by the forwardly-pressed buffer would flow rearwardly around the buffer (but air can flow rearwardly around the buffer so the entire bore forward of the buffer is occupied by adhesive). However, for the bore 100 shown, there is very little clearance so little if any adhesive is pumped rearwardly to lie around the buffer. However, the very close fit of the buffer in the rearward bore portion 106, results in the buffer 20B being fixed against sideward (radial to axis 104) movement within the bore. A primary purpose for providing any adhesive around a buffer or jacket is to prevent sideward movement of a location of it that lies adjacent to an uncovered fiber part, to prevent breaking the fiber. The avoidance of sideward buffer movement by a close fit accomplishes the same goal. The presence of adhesive around the fiber 22B prevents its axial movement, and large tension forces are not appied to the buffer or jacket that would make it likely that the optical fiber would be broken.

The clearance between the fiber 22B and the front bore. portion 30B varies between less than one micron (0.00004 inch) and about three microns. The most commonly used fibers have diameters of 125 microns and 140 microns, with those of 240 microns used less often. If the clearance between the fiber and the bore front portion is very small, then adhesive may not flow forwardly (or not all the way) through the front bore portion. However, air can escape around the fiber to allow adhesive to flow up to the front bore portion. The fact that the fiber is then very closely surrounded by the front bore portion 30B, results in it being well supported for grinding and polishing despite the lack of adhesive in the front bore portion. In any case, however, at least the fiber portion immediately behind the front bore portion 30B will be well supported by adhesive 34B.

Thus, the invention provides a method for terminating a stripped end of an optic cable to a terminus body, which can result in a buffer and/or front jacket region and the optical fiber being bonded to a terminus body by a single quantity of adhesive. The method includes inserting the front of a stripped optic cable into a terminus body, with the optical fiber extending through a narrow front bore portion and through part of a second bore portion containing adhesive, and with the buffer and/or jacket of the optic cable bearing against the rear end of the quantity of adhesive. With the adhesive in a flowable state, the optic cable is pressed forwardly deeper into the terminus body with the buffer and/or jacket displacing adhesive to flow forwardly at least up to the front bore portion and 11 also rearwardly around the buffer and/or front jacket region. The result is a termination wherern the optical fiber is securely held by the same quantity of adhesive that bonds the forward jacket region to the terminus body. Where a buffer fits very closely in a terminus body bore, it may not be necessary to bond it to the terminus body.

Although particular embodiments of the invention have been described and illustrated herein, it is recognized that modifications and variations may readily occur to those skilled in the art and consequently it is intended to cover such modifications and equivalents.

What is claimed is:

1. In a method for the termination of an optic cable which includes an optical fiber and a cable protective portion that includes a buffer lying around the fiber, wherein the cable has been stripped so the optical fiber extends forward of the cable protective portion, to a terminus body which includes an elongated bore with a narrow front bore portion that closely receives the optical fiber to align it, and wherein the terminus body also includes at least one wider second bore portion behind the front bore portion for receiving at least part of said protective portion, the improvement comprising:

placing a quantity of adhesive in said bore behind said bore front portion;
   inserting a portion of said optic cable into said bore from the rear bore end until said optic fiber passes through said front bore portion, and a part of said cable protective portion that includes said buffer lies at substantially the rear of said quantity of adhesive;
   establishing said quantity of adhesive in a high viscosity flowable state, and forcing said optic cable forwardly relative to said terminus body, to use said part of said cable protective portion which surrounds said fiber as a piston that forces said adhesive forwardly around said then allowing said adhesive to harden.

2. The method described in claim 1 wherein:
said part of said cable protective portion is of small enough diameter to leave a clearance with the walls of said second bore portion, and said step of forcing said optic cable forwardly includes forcing adhesive rearwardly around said cable protective part, to cause said adhesive to lie between said cable protective part and the walls of said second bore portion.

3. The improvement described in claim 1 wherein:
said cable protective portion includes a jacket around said buffer, said buffer extends forward of said jacket;
said step of forming said terminus body bore includes forming it to have a third bore portion lying behind said second bore portionm, with said second bore portion closely receiving said buffer but with a clearance between them and said third bore portion closely receiving said front outer jacket region but with a clearance between them;
said step of forcing includes forcing said buffer into said second bore portion to displace said adhesive, flowing said adhesive rearwardly through asid second bore portion around the buffer therein and into said third bore portion, and moving the front end of said front jacket region against adhesive in said third bore portion to force it rearwardly around said front jacket region.

4. The improvement described in claim 1 wherein:
said step of inserting includes inserting said optical fiber completely through said front bore portion and until the front tip of said optical fiber lies a distance forward of said front bore portion, and said step of forcing includes forcing said adhesive forwardly through said bore front portion and around a portion of said optical fiber that lies forward of said bore front portion.

5. The improvement described in claim 1 wherein:
said step of placing a quantify of adhesive includes placing a plurality of ring-shaped pellets of adhesive material in a bore portion that lies immediately behind said front bore portion.

6. The improvement described in claim 1 wherein:
said cable protective portion includes a jacket around said buffer, said jacket having a front outer jacket region that includes a jacket of low surface energy material and a strength member which extends around a front portion of said jacket, said step of forcing includes flowing said adhesive between said strength member and the walls of said bore.

7. A method for terminating the stripped end of an optic cable that includes a jacket with a front jacket region, a buffer extending forward of the jacket, and an optical fiber extending forward of the buffer, in a terminus body that has front and rear ends and that includes a bore with a front bore portion of slightly greater diameter than said optical fiber to closely receive it and a second bore portion lying rearward of said front bore portion and of greater diameter than said buffer to receive it, said bore being long enough to receive said front jacket region when said optical fiber passes through said front bore end portion and forward thereof, comprising:

establishing a quantity of adhesive in a flowable state in said second bore portion, and establishing said optic cable with said optical fiber extending through said adhesive and through said front bore end portion and forward of said body front end;

pushing said optic cable forwardly with respect to said body to press said buffer into said adhesive and to advance said front jacket region into said bore, until said adhesive flows rearwardly around said buffer and around said front jacket region, and then allowing said adhesive to harden.

8. The method described in claim 7 wherein:

said terminus body bore includes a third bore portion of greater diameter than said second bore portion and extending rearward of said second bore portion, said second and third bore portions being of sizes to closely receive said buffer and said front jacket region, respectively;

said step of pushing includes using said buffer as a piston to displace said adhesive to flow to the rear of said second bore portion and into the front of said third bore portion, and using said front jacket region as a piston to displace adhesive that has flowed into the front of said third bore portion to flow said adhesive rearwardly around said front jacket region.

9. In an optic cable termination that includes an optic cable having an optical fiber and a protective portion that lies around the fiber and that includes a buffer, with the optical fiber extending forward of the buffer, wherein the cptic cable is held to a terminus body having a bore, with the fiber passing through a bore ront portion that closely surrounds the fiber and with the fiber held by a single quantity of adhesive to the walls of said bore, with a portion of the cable that surrounds the optical fiber extending partially into a second bore portion in the body that lies behind the bore front portion and that closely surrounds said portion of the cable that surrounds the fiber, the improvement wherein:

said single quantity of adhesive extends continuously from said bore front portion through said second bore portion and fills substantially all of the volume of said second bore portion not occupied by said fiber and said portion of said cable that is closely surrounded by said second bore portion.

10. The improvement described in claim 9 wherein:

said optic fiber has a front end that extends a distance forward of said bore front portion, and said adhesive extends completely through and forward of said bore front portion and adheres a portion of said optic fiber lying forward of said bore front portion to the outside of said terminus body in an area around said bore front end.

11. The improvement described in claim 9 wherein:

said terminus body includes a third bore portion that lies behind said second bore portion, said portion of said cable that is closely surrounded by said second bore portion being said buffer, and said front jacket region lies in said third bore portion.

12. An optic cable termination, comprising:

an optic cable which includes an optical fiber and a cable protective portion that inlcudes a buffer, surrounding said fiber, with said fiber extending forward of the buffer;

a terminus body with a bore that includes a bore front portion and a wider second bore portion that lies behind the fore front portion;

a quantity of adhesive lying in said terminus body;

said fiber passing through and being closely surrounded by said bore front portion and said fiber being bonded by said single quantity of adhesive to the walls of said bore, with a part of said cable protective portion extending partially into said second bore portion and with said cable part being closely received in said second bore portion;

said single quantity of adhesive extends continuously from said bore front portion through said second bore portion at least up to the front end of said cable part that extends into said second bore portion.

* * * * *